May 23, 1967 L. R. PETERSON 3,321,752

MULTI-TAPE TRANSPORT ASSEMBLY

Filed July 9, 1963 2 Sheets-Sheet 1

INVENTOR
LAVERNE R. PETERSON
BY Charles A. Johnson
ATTORNEY

May 23, 1967 L. R. PETERSON 3,321,752

MULTI-TAPE TRANSPORT ASSEMBLY

Filed July 9, 1963

2 Sheets-Sheet 2

United States Patent Office 3,321,752

Patented May 23, 1967

3,321,752

MULTI-TAPE TRANSPORT ASSEMBLY

Laverne R. Peterson, St. Paul, Minn., assignor to Sperry Rand Corporation, New York, N.Y., a corporation of Delaware Filed July 9, 1963, Ser. No. 293,775
11 Claims. (Cl. 340—174.1)

ABSTRACT OF THE DISCLOSURE

A tape transport unit which is capable of utilizing a plurality of magnetic tapes simultaneously. The magnetic tape unit is supplied with a reel of tape which has a plurality of magnetic tapes wound thereon, and which are capable of being scanned simultaneously by a like plurality of read-write heads. Control circuits are provided for energizing supply and takeup reel and for selecting a particular one of a plurality of read-write heads for a transducing operation.

This invention relates to magnetic tape storage systems, and more particularly, is concerned with the utilization of a plurality of magnetic tapes by a single tape transport.

Tape recorder systems have been used heretofore to provide storage means for digital computers, and as auxiliary equipment to other data processing equipment. In general, information is transferred from storage on a magnetic tape into the computer or other equipment in blocks of information signals at a time. In practice it is often desirable to move the magnetic tape to a predetermined block or sector to utilize only a portion of the data stored on the magnetic tape, or to write a new block or blocks of data on the magnetic tape. Further, it is often desirable to utilize data stored on a magnetic tape from various non-adjoining blocks during a single data processing operation. These operations raise the problem of access time to the various data blocks whereby associated equipment is often held inoperative during the positioning of the tape transport. Here "access time" is defined as the time interval between the instant at which the data processing unit calls for information from the memory unit and the instant at which the information is delivered; or the time interval between the instant at which the data processing unit starts to send information to the memory unit and that instant at which the storage of the information in the memory unit is completed. A magnetic tape storage system is serial in its accessibility in that one of the coordinates used to locate the given block appears sequentially in time such that the access time includes a variable latency or waiting time depending upon the location of the desired block in combination with the existing position of the Magnetic Tape Unit.

A common operating speed for a magnetic tape transport is 100 inches per second. The length of the magnetic tapes associated with transport is variable, with a length of 1500 feet being characteristic. From these values, the following calculation indicates the amount of time necessary just to position the magnetic tape from one end to the other.

$$\frac{1500\text{ ft.}\times 12\text{ in./ft.}}{100\text{ in./sec.}\times 60\text{ sec./min.}}=3\text{ minutes}$$

It is common, therefore, for the time required to move a magnetic tape from one end to the other to be in the range of two to four minutes depending upon the length of the tape and the speed of the transport, whereas computational rates proceed with an average instruction time ranging from a few microseconds to the millisecond range. For instance, if it is assumed that the average execution time for each instruction operation of the data processor is 20 microseconds and the magnetic tape described above must be moved one-half its length to access data stored thereon, the number of instructions which could have been performed during the access time would be approximately—

$$\frac{1.5\text{ min.}\times 60\text{ sec./min.}\times 10^{6}\mu\text{ sec./sec.}}{20\times 10^{-6}\text{ sec./instruction}}$$
$$=4.5\times 10^{6}\text{ instructions}$$

From this it can readily be seen that any reduction of the time required to access data stored on a magnetic tape will greatly enhance the efficiency of utilization of the computational time of an associated data processing unit. In those situations where computation is held up pending the availability of data to be read from a magnetic tape, or writing calculated data on a magnetic tape, that considerable inefficiency exists.

The present invention in its operation tends to minimize the amount of time delay, i.e., improve the average access time, by providing a plurality of magnetic tapes wound on the same reel and passed by individual read-write heads in a manner such that the plurality of magnetic tapes are scanned simultaneously to position to the desired information blocks.

*Objects*

Accordingly, a primary object of this invention is to provide an improved magnetic tape transport.

Another object of this invention is to provide a magnetic tape transport system having an improved average access time.

Still a further object of this invention is to provide a tape transport for handling a plurality of magnetic tapes simultaneously for improving the average access time for data stored on the tapes, and for storing data on the tapes.

Yet another object of this invention is to provide an improved magnetic tape transport system which permits of selection for reading and writing from ones of a plurality of magnetic tapes.

While this improved product might be produced by other means and methods with the desired advantageous results following therefrom, that contemplated and described herein is especially advantageous and desirable in promoting economy in the components required, and in the utilization of the data processing computational time by reducing the average access time required by the Magnetic Tape Unit.

The above and other more detailed and specific objects will be disclosed in the course of the following specification, reference being had to the accompanying drawings, in which.

The invention will appear more clearly from the following detailed description when taken into connection with the accompanying drawings of the preferred embodiment of this invention.

The Magnetic Tape Unit is designed to transport a plurality of magnetic recording tapes past individual read-write heads under control of a synchronizer (not shown) which is part of the data processing unit, and to perform the following main functions:

(1) Receive information from the data processing unit and record it on magnetic tape;

(2) Read data from the magnetic tape and transmit it to a data processing unit; and (3) Position the magnetic tape to predetermined positions.

Figure 1:
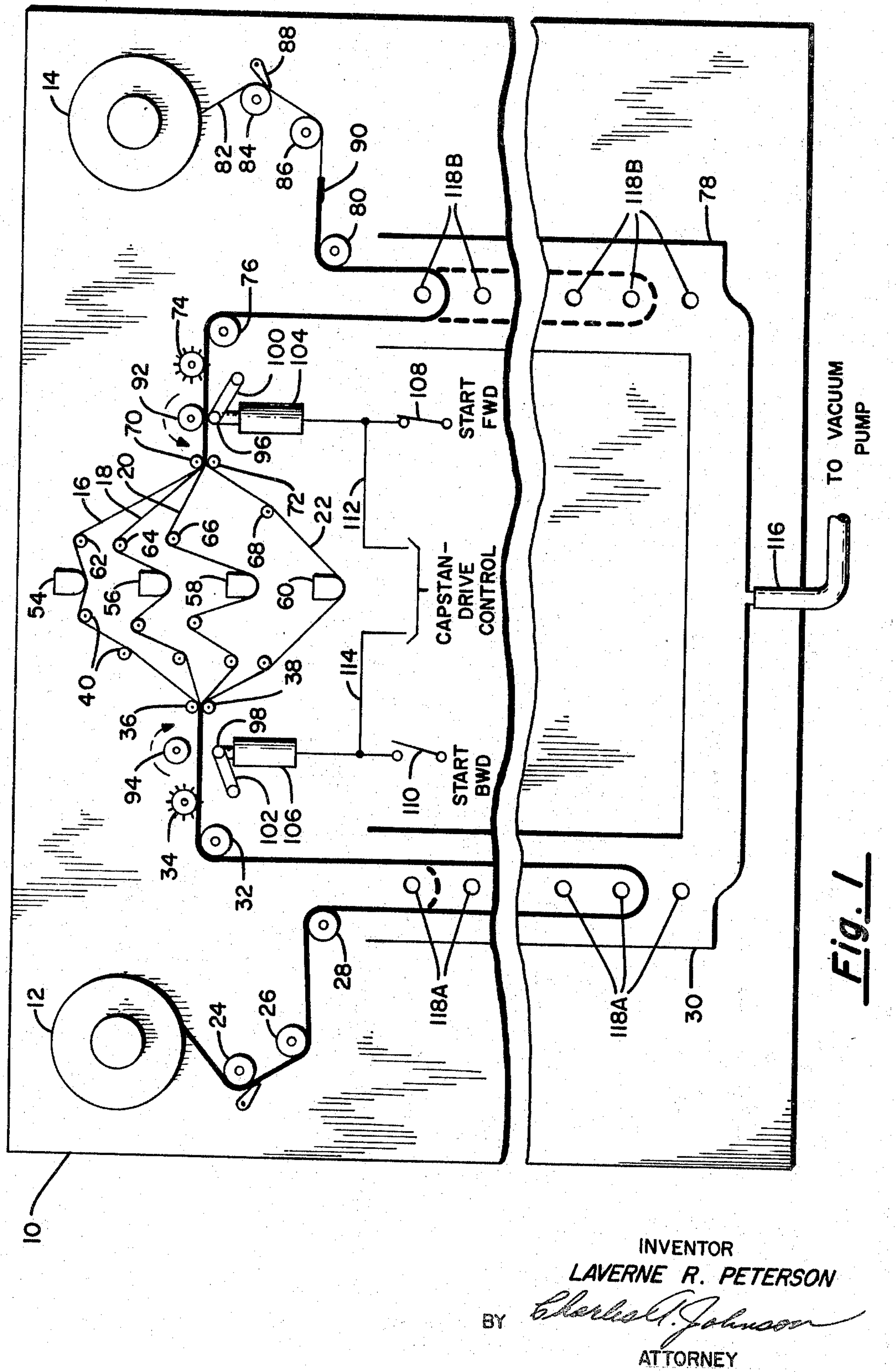
FIG. 1 is a schematic block diagram of the tape transport system.

FIG. 1 illustrates in schematic block diagram form the magnetic tape transport system. The numeral 10 indicates generally a frame which supports the tape transport system. The tape transport system includes a tape storage reel 12 and a tape take-up reel 14. The reels 12 and 14 are driven in a conventional manner by means of reversible reel drive motors, and will be described in more detail below. The storage reel 12 has a plurality of tapes wound thereon, and for illustrative purposes four tapes, 16, 18, 20 and 22 are shown. This is for illustrative purposes only and limitation to this arbitrary number is not thereby intended. The tapes from storage reel 12 are threaded around roller-guides 24, 26, and 28 into the left hand loop-box vacuum chamber 30. The tapes are then threaded past roller-guide 32 into registration with free-running registration sprocket 34. Sprocket 34 engages each of the tapes via registration holes (see FIG. 2) provided at appropriate intervals to maintain registration of the respective magnetic tapes as they approach the read-write heads. The tapes are then passed between restraining guide-pins 36, 38. At this juncture the plurality of magnetic tapes are separated and threaded around their respective guide-pins, illustratively labelled 40 for tape 16, and then past their respective read-write heads 54, 56, 58, and 60. Guide-pins 62, 64, 66, and 68 are provided to appropriately guide the respective tapes in a manner to be brought back together between restraining guide-pins 70 and 72. A second registration sprocket 74 is provided to assure proper re-registration when the tapes are brought back together such that slippage will be eliminated. The total length of tape for each of the tapes 16 through 22 between restraining guide-pins 36–38 and 70–72 is identical. This amount of magnetic tape is governed by the positioning of the respective guide-pins 40 and 62–68 and accommodates the displaced spacing of the respective read-write heads 54 through 60. The magnetic tapes are threaded from the second registration sprocket 74 past roller-guide 76 into the right hand loop box vacuum chamber 78, and thence past roller-guide 80. The take-up reel 14 is provided with an attached leader section 82 which is threaded past roller-guides 84 and 86, and maintained in a fixed position by limit switch 88 when the tape transport is in the turned off condition. This leader 82 is provided with a clip (to be described in more detail below) which is attached to a mating clip on the end of the plurality of magnetic tapes to form a connection 90.

A pair of capstans 92 and 94 driven in opposite directions by suitable drive means (not shown) in the direction of the respective arrows, and are utilized to drive the tapes in one direction or the other past a plurality of multi-channel read-write heads 54 through 60. The direction of the tape is determined by means of pinch rollers 96, 98 journaled in suitable pivot support arms 100 and 102 respectively. The pinch rollers 96 and 98 are respectively moved into engagement with the magnetic tapes so as to press the tapes against the respective one of the capstans

92 and 94 by means of solenoids 104 and 106 as supported by the main frame 10 and linked to the respective support arms 100 and 102. The activation of solenoids 104 and 106 may be either from a manual switch at the tape unit transport 108 and 110 or by a signal received via control circuits from a data processing unit via conductors 112 and 114. The operation is such that the activation of solenoids 104 and 106 is mutually exclusive thereby providing for movement of the magnetic tapes in one direction only.

The left loop-box vacuum chamber 30 and right loop-box vacuum chamber 78 are mutually coupled via pipe 116 to a conventional vacuum pump (not shown). The left loop-box contains a plurality of ports 118A and the right loop-box contains a plurality of ports 118B which are utilized in the control of the magnetic tape drive systems and will be described in more detail below.

Figure 2:
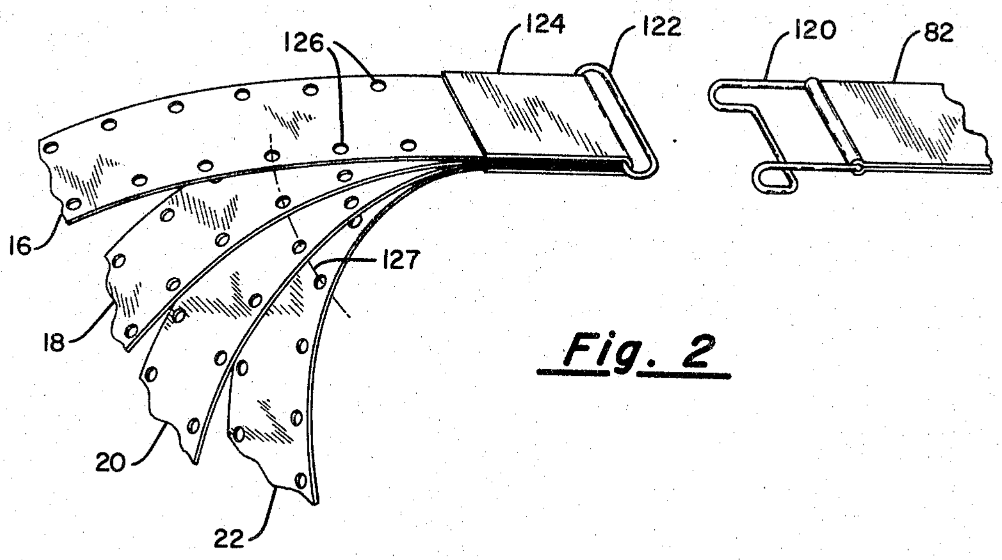
FIG. 2 is an isometric sectional view illustrating four magnetic tapes coupled at one end for attachment to a leader, and shows the registration sprocket holes.

FIG. 2 illustrates the apparatus utilized to couple the plurality of magnetic tapes 16, 18, 20, and 22 to the leader 82 which is attached to the take-up reel. This apparatus consists of a hook 120 which is arranged for coupling to an eye 122. The magnetic tapes 16 through 22 are fastened at their leading end by a retaining means 124 which is utilized also hold the eye member 122. The retaining means 124 is arranged such that the sprocket holes, illustratively marked 126 on magnetic tape 16, are in axial alignment 127 for each of the magnetic tapes. This arrangement is required so that the idler registration sprockets 34 and 74 can keep the plurality of magnetic tapes in exact registration when being handled by the magnetic tape transport.

Figure 3:
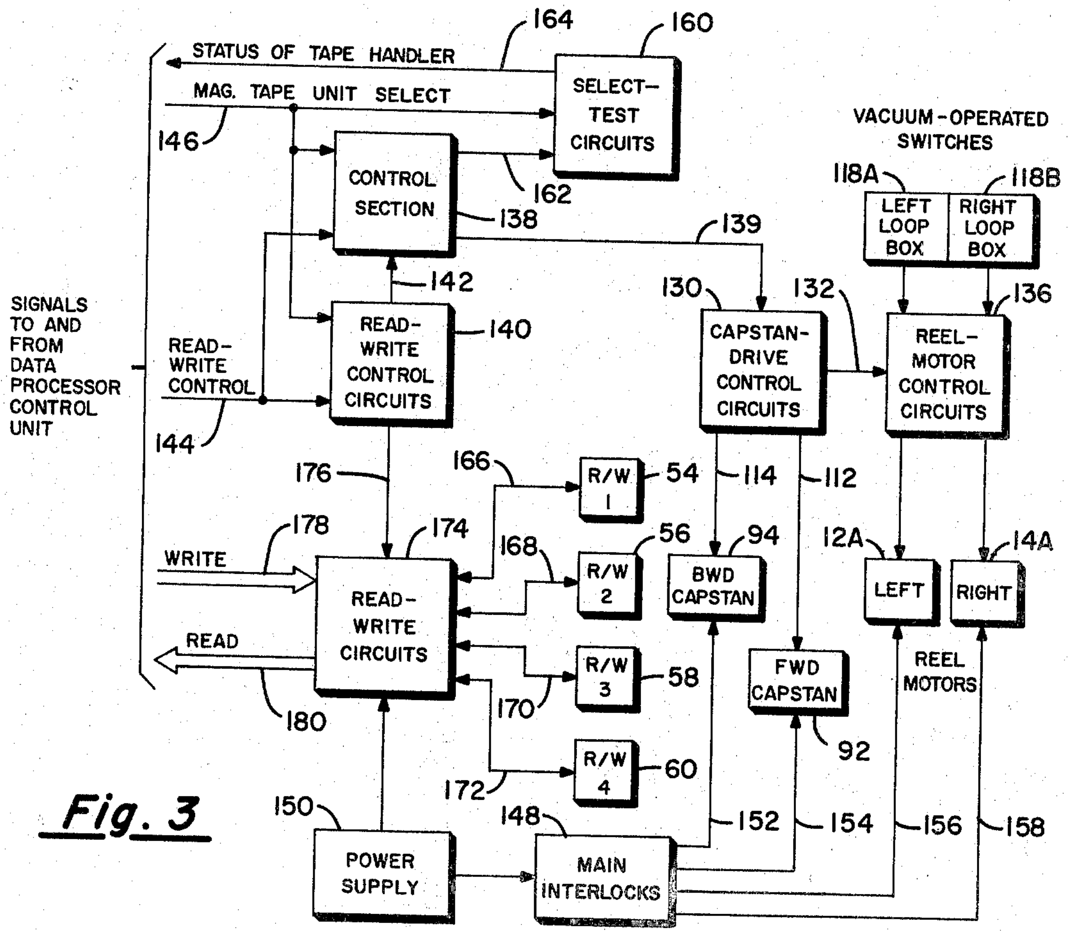
FIG. 3 is a functional block diagram of the controls associated with the tape transport unit.

The discussion presented in conjunction with FIG. 3 will describe the coordinated mechanical and electrical operation of the Magnetic Tape Unit. The simplified drawing is presented to illustrate the relationship of the components and their control. It is not felt that a detailed treatment would tend to add to the understanding or clarify this invention.

The magnetic tapes are driven past the read-write heads 54–60 by capstans 92 and 94. The capstans are coupled to a drive motor by means of a clutch and brake mechanism of a type well known in the art (not shown). The drive motor itself rotates continuously in one direction, and selectively provides power in both the forward and backward direction. The clutch and brake mechanism enables the capstan to be started or stopped. This enables the tapes to be accelerated full speed or decelerated to a stop in under 5 milliseconds. This illustrative embodiment provides for moving the magnetic tapes via the transport at nominal speeds of 100 inches per second. The operation of the clutch and brake mechanism is controlled by a data processor during read and write operations. The operation of the capstan-drive control circuits 130 is to provide a signal on conductor 112 to cause the forward (FWD) capstan 92 to be activated, and to enable the forward solenoid 104 (see FIG. 1) to thereby cause the magnetic tapes to be engaged between forward capstan 92 and the pinch roller 96. When reverse direction is selected, the drive control circuits 130 provide a pulse on conductor 114 to cause the backward (BWD) capstan 94 to be activated, and enables drive solenoid 106 thereby causing the magnetic tapes to be engaged by pinch roller 98 and forced into contact with backward capstan 94. The capstan-drive control circuits 130 include circuitry for establishing the mutually exclusive selection of either the forward or backward tape movement. The capstan-drive control circuits 130, in addition to controlling the activation of capstans 92 and 94, provides a control on line 132 to the reel-motor control circuits 136 which provides for control of the activation of the reel motor 12a and 14a such that the appropriate clutch and brake mechanism is activated for starting and stopping in the forward or backward direction.

A vacuum system in the Magnetic Tape Unit maintains pressure between the tape and the read-write heads, and pulls slack tape between the capstans and the tape reels into the sections of the loop-box. The right and left loop-boxes 30 and 78 each serve as a tape reservoir. A servo system comprised of control circuitry 136 to control the reel motors monitors the amount of the tape in the respective loop boxes, and controls the speed of the operating reel motor 12A or 14A so that the amount of tape in the boxes is maintained sufficient to compensate for differences in acceleration and deceleration between the slower large reel motors 12A and 14A, and the rapidly accelerating and decelerating capstans 92 or 94. The control circuits 136 senses loop position through ports 118A and 118B (see FIG. 1) that are placed in each of the loop-box sections, and which respectively operate a plurality of vacuum switches (not shown). The operation is such that switches associated with ports below the tape loops are actuated while those enclosed by the tape loop are not. When the servo system senses that one of the loop-boxes does not contain enough tape (determined by the activation of a plurality of the vacuum switches) the appropriate reel motor is adjusted to either speed up the supply reel or slow the take-up reel depending on which loop-box is low in supply. The reverse operation takes place if it is detected that too much tape is in one of the loop-boxes.

The direction in which the tapes move is controlled by the control section 138 which in turn is selectively controlled by the read-write control circuit 140 via one conductor of cable 142. Effectively either tape reel 12 or 14 may serve as the supply or take-up reel depending on the direction of the tape motion. Before the tape is driven, the supply reel loop-box section contains a sufficient reserve of tape so that the tapes will not be drawn from the loop-box as a result of the faster acceleration of one of the capstans 92 or 94 than the driven reel. Conversely, the take-up reel loop box section has enough room to contain the tape which the take-up reel cannot handle because it accelerates more slowly than the driven capstan. Referring to FIG. 1, if the tape motion is from left to right, that is forward direction, then the initial static condition of the tape loops is indicated by the solid tape line. When the reel motors have accelerated and are maintaining the proper tape speed, the loop balance is reversed to the position indicated by the dashed tape line, so that differences in deceleration rates are compensated for. Since both reels 12 and 14 are still decelerating after the capstan has completely decelerated, the take-up reel 14 requires excess tape in the loop-box 78 and the supply reel loop-box must have reserve room for the tape that will be spilled out by the supply reel 12. For the condition when the tape transport is being run backward, the opposite situation prevails and the dashed tape indicates the static backward condition. When the tape transport is actually being run backwards, the loops shift as described above and the solid tape line indicates the running position.

As was described above, each loop-box section 30 and 78 has ten vacuum ports 118A and 118B respectively that channel the vacuum pressures to a series of ten vacuum switches (not shown). The ports are placed vertically from the top to the bottom of the loop-box section and as the tapes position between ports, those ports above the tape loop are at room pressure and their associated switches are not actuated. When the capstan moves the tapes resulting in a change in loop size, the change is detected by the actuation of an adjacent vacuum switch. Operation of the vacuum switches in this way results in an output voltage that represents loop size, and is utilized to cause the reel motor control circuits 136 to adjust reel motor current and restore each loop to the correct size.

The control section 138 is responsively coupled to cable 144 which supplies signals from the data processing unit indicating which operation is to be performed by the magnetic tape transport. These operations consist of movement forward, movement backward, rewind, rewind with interlock, read, and write.

The signals which are supplied to make these selections are shown below, and are either programmed for the data processing unit, or are calculated.

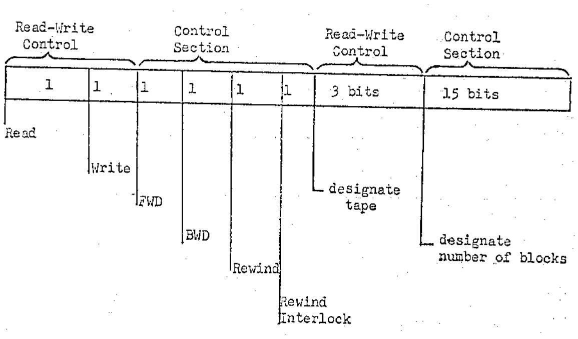

To Read Forward to designated number of blocks, enable signals would be programmed for the Read digit and the FWD digit, and the desired number of blocks would be entered in the right-most 15 digits. The three digits segregated for selecting the magnetic tape would be set to the desired number. Operation would be to apply the Read enable via a conductor in cable 144 to the read-write control circuits 140 to effectively select the appropriate read circuits 174. Additionally, the digits utilized to specify the desired magnetic tape would be directed to the read-write control circuits 140 to make the final determination via cable 176 of which read amplifiers 174 are to be activated. The read-write control circuits 140 also activates the Read circuit in the control section 138 via cable 142. The FWD enable is transmitted to the control section 138 to activate the FWD control circuits, which in turn control the capstan-drive control circuits 130 via cable 139 to determine whether the FWD or BWD solenoids, 100 and 102 respectively, will be activated. The digits which designate the numbers of blocks are transmitted to the control section 138 to determine the duration of the operation. The other specified operations are carried forward by similar programming of desired enables and selected tape parameters, and will not be described further.

It is necessary also to initiate operation of the magnetic tape transport that the data processing unit provide an enable signal on conductor 146 thereby enabling the control circuitry 138. This feature is provided to allow a plurality of magnetic tape transports to be utilized by a single data processing unit, and as a means for automatically signaling the magnetic tape transport when it is ready to be referenced by the data processing unit. Each of the control circuits which comprise the control section 138 comprises a basic two input AND accompanied with a one-bit memory element, and is of a type well known in the art. In addition to the six operational control circuits, each magnetic tape transport contains a main interlock control circuit 148 that is enabled by manually turning the magnetic tape transport on, and is disabled automatically when an abnormal condition is detected or manually if the tape unit is turned off. When the main interlock circuit 148 is active, the power supply 150 is coupled via conductors 152 and 154 to the capstans 92 and 94 via conductors 156 and 158 to the reel motors 12A and 14A.

Table I illustrates the operative relationship required for the respective control circuits for the designated magnetic tape operations.

TABLE I

| Transport Operation | Control Circuits Active | | | | | |
|---|---|---|---|---|---|---|
| | Forward | Backward | Read | Write | Rewind | Rewind with Interlock |
| Read Forward | X | | X | | | |
| Read Backward | | X | X | | | |
| Write Forward | X | | | X | | |
| Rewind | | X | | | X | |
| Rewind with Interlock | | X | | | X | X |

In addition to altering the state of the control section circuits 138, the signal received from the data processor which selects the magnetic tape transport via conductor 146, is applied to the select-test circuits 160 along with signals from the control section 138 which are applied via cable 162. The function of the select-test circuits 160 is to provide signals via cable 164 to the data processing unit which indicates the status of the tape handler. The test circuits 160 are comprised of AND circuits of the type well known in the art.

The read-write heads 54–60 are transducers of the type well known in the art, and are respectively controlled via cables 166, 168, 170, and 172 which are coupled to the read-write circuits 174. The operation is such that the read-write control circuits 140 control the selection of the read-write circuits 174 via cable 176 and provide for the selective operation of the read-write heads 54–60. This is done selectively according to the selection made by the control signals supplied from the data processing unit. During a write operation, the read-write circuits 174 receive information signals from the data processing unit via cable 178 which is in turn directed to the appropriate read-write heads 54–60 by the control of the read-write control circuits 140 which activate the appropriate write circuit 174. For the read operation, the read-write circuits 174 read the appropriate magnetic tape by way of a selected one of the read-write heads under control of the read-write control circuits 140 and issue the signals thereby read over cable 180 to the data processing unit.

The foregoing discussion has been directed to describing a supply reel assembly which has the plurality of magnetic tapes superposed, and bound at the leading end to form a layered combination. An alternative arrangement having the same advantages is to provide a reel assembly which has the plurality of tapes wound in a side-by-side configuration, and having the leading end bound for proper registration. With appropriate adjustment of the read-write heads, the operation would be substantially as described above.

From the above description it will be seen that average access time to a desired location on a magnetic tape is appreciably reduced by providing apparatus for utilizing a plurality of tapes simultaneously, thereby reducing the effective length of the tape record. Such an effective reduction promotes efficiency in the utilization of a controlling data processor in that the average time necessary to access a desired position permits a greater amount of time for the actual computational processes.

It is understood that suitable amount of modifications may be made in the structure as disclosed provided such modifications come within the spirit and scope of the appended claims. Having now, therefore, fully illustrated and described our invention, what we claim to be new and desire to protect by Letters Patent is set forth below.

What is claimed is:

1. In a data processing system, transport apparatus for recording and reading a magnetic tape record assembly made up of at least two superposed magnetic tapes connected together at their respective leading ends, each tape for magnetically recording data manifestations for use in data processing and having aligned registration means, the magnetic tape record assembly arranged for coupling to and winding upon first and second storage reels, comprising:

a support member;

means including a first storage reel for feeding out a magnetic tape record assembly as it is moved in a forward direction and winding up a magnetic tape record assembly as it is moved in a backward direction;

means including a second storage reel for winding up a magnetic tape record assembly as it is moved in a forward direction and for feeding out a magnetic tape record assembly as it is moved in a backward direction;

means including a plurality of transducers for selectively recording and reading magnetic data manifestation on selected ones of the magnetic tapes, said transducers mounted on said support member between said first and second storage reels;

means for selectively driving the magnetic tapes in a forward and backward direction past respectively associated ones of said transducers;

registration means for engaging the magnetic tapes to assure proper alignment as the tapes pass the respective ones of said transducers; and, a first plurality of magnetic tape guide members mounted on said support member between said transducers and said first registration sprocket and a second plurality of magnetic tape guide members mounted on said support member between said transducers and said second registartion sprocket for guiding associated magnetic tapes and maintaining relative alignment of the tapes of the magnetic record assembly.

2. Transport apparatus as in claim 1 wherein the driving means respectively comprises at least one driven capstan rotatably mounted on said support members and a journaled pinch-roller for engaging the superposed magnetic tapes to impart motion thereto.

3. Transport apparatus as in claim 1 wherein said registration means comprises at least one sprocket rotatably mounted on said support member for engaging the magnetic tapes.

4. In a data processing system, transport apparatus for recording and reading a magnetic tape record assembly made up of at least two superposed magnetic tapes connected together at their respective leading ends, each tape for magnetically recording data manifestations for use in data processing and having evenly spaced mutually aligned registration sprocket holes, the magnetic tape record assembly arranged for coupling to and winding upon first and second storage reels, comprising:

a support member;

means including a first storage reel for feeding out a magnetic tape record assembly as it is moved in a forward direction and winding up a magnetic tape record assembly as it is moved in a backward direction;

means including a second storage reel for winding up a magnetic tape record assembly as it is moved in a forward direction and for feeding out a magnetic tape record assembly as it is moved in a backward direction;

means including a plurality of transducers for selectively recording and reading magnetic data manifestation on selected ones of the magnetic tapes, said transducers mounted on said support member between said first and second storage reels;

means for driving the magnetic tapes in a forward direction contiguously past associated ones of said transducers;

means for driving the magnetic tapes in a backward direction contiguously past associated ones of said transducers;

means for selectively activating said forward and backward direction driving means;

a first magnetic tape reservoir between said first storage reel and said transducers;

a second magnetic tape reservoir between said second storage reel and said transducers;

a first registration sprocket between said first storage reel and the backward driving means for engaging the evenly spaced sprocket holes in the magnetic tapes to assure proper alignment;

a second registration sprocket between said second storage reel and the forward driving means for engaging the evenly spaced sprocket holes in the magnetic tapes for assuring proper alignment; and, a first plurality of magnetic tape guide members mounted on said support member between said transducers and said first registration sprocket and a second plurality of magnetic tape guide members mounted on said support member between said transducers and said second registration sprocket for guiding associated magnetic tapes and maintaining relative alignment of the tapes of the magnetic record assembly.

5. Transport apparatus as in claim 4 wherein the forward driving means and the backward driving means respectively comprise a driven capstan rotatably mounted on said support member and a journaled pinch-roller for engaging the superposed magnetic tapes to impart motion thereto.

6. Transport apparatus as in claim 5 wherein the forward and reverse activating means comprises:

first and second input terminals for respectively receiving forward and backward selection energizing power signals;

a forward solenoid mounted on said support member and coupled to said first input terminal for activation in response to an applied forward selection power signal;

a backward solenoid mounted on said support member and coupled to said second input terminal for activation in response to an applied backward selection power signal;

a first driving member actuated by said forward solenoid and coupled to a journaled pinch-roller for causing the superposed magnetic tapes to be engaged by said forward driven capstan when said forward solenoid is activated; and, a second driving member actuated by said backward solenoid and coupled to a journaled pinch-roller for causing the superposed magnetic tapes to be engaged by said backward driven casptan when said backward solenoid is actuated.

7. In a data processing system, transport apparatus for recording and reading a magnetic tape record assembly made up of at least two superposed magnetic tapes connected together at their respective leading ends, each tape for magnetically recording data manifestations for use in date processing and having evenly spaced mutually aligned registration sprocket holes, the magnetic tape record assembly arranged for coupling to and winding upon first and second storage reels, comprising:

a support member;

means including a first storage reel for feeding out a magnetic tape record assembly as it is moved in a forward direction and winding up a magnetic tape record assembly as it is moved in a backward direction;

means including a second storage reel for winding up a magnetic tape record assembly as it is moved in a forward direction and for feeding out a magnetic tape record assembly as it is moved in a backward direction;

a first plurality of input terminals for carrying selection signals indicative of a desired one of the magnetic tapes;

a second plurality of input terminals for carrying selection signals for selecting a record and a read operation;

circuit means including a plurality of transducers coupled to said first and second plurality of input terminals for selectively recording and reading magnetic data manifestation on selected ones of the magnetic tapes in response to applied input signals, said transducers mounted on said support member between said first and second storage reels;

means for driving the magnetic tapes in a forward and backward direction contiguously past respectively associated ones of said transducers;

a third plurality of input terminals for carrying selection signals indicative of a desired direction of movement of the magnetic tapes;

a fourth plurality of input terminals for carrying selection signals indicative of desired reference location on the magnetic tapes;

circuit means coupled to said third and fourth plurality of input terminals for selectively activating said forward and backward direction driving means;

a first magnetic tape reservoir between said first storage reel and said transducers;

a second magnetic tape reservoir between said second storage reel and said transducers;

registration means for engaging the magnetic tapes to assure proper alignment as the tapes pass the respective ones of said transducers; and, a first plurality of magnetic tape guide members mounted on said support member between said transducers and said first registration sprocket and a second plurality of magnetic tape guide members mounted on said support member between said transducers and said second registration sprocket for guiding associated magnetic tapes and maintaining relative alignment of the tapes of the magnetic record assembly.

8. Transport apparatus as in claim 7 wherein said registration means comprises at least one sprocket rotatably mounted on said support member for engaging the holes in the aligned magnetic tapes.

9. Transport apparatus as in claim 7 wherein the driving means respectively comprise a driven capstan rotatably mounted on said support member and a journaled pinch-roller for engaging the superposed magnetic tapes to impart motion thereto.

10. Transport apparatus as in claim 9 wherein the forward and backward activating means comprises:

first and second terminals for respectively receiving forward and backward selection energizing power signals;

a forward solenoid mounted on said support member and coupled to said first terminal for activation in response to an applied forward selection power signal;

a backward solenoid mounted on said support member and coupled to said second terminal for activation in response to an applied backward selection power signal;

a first driving member actuated by said forward solenoid and coupled to a journaled pinch-roller for causing the superposed magnetic tapes to be engaged by said forward driving capstan when said forward solenoid is activated; and, a second driving member actuated by said backward solenoid and coupled to a journaled pinch-roller for causing the superposed magnetic tapes to be engaged by said backward driving capstan when said backward solenoid is activated.

11. In a data processing system for use with transport apparatus having first and second storage reels, one of said reels having an attached leader, a plurality of recording and reading transducers, a forward and backward driving mechanism, and registration apparatus, a magnetic tape record assembly, comprising:

a plurality of elongated members, each having a magnetizable coating on one surface of the carrier for providing a record medium, said members wound in a superposed relationship with the magnetic coating of each member, except the outermost turn, contiguous to the uncoated surface of the adjacent carrier, and each of said members having evenly spaced registration apertures; and, coupling means at the leading ends of said members for connecting the superposed members to a leader and for maintaining the members with the corresponding respective apertures in mutual alignment.

References Cited by the Examiner

UNITED STATES PATENTS

| | | | |
|---|---|---|---|
| 2,666,813 | 1/1954 | Camras ---------- | 179—100.2 |
| 2,787,464 | 4/1957 | Davidson et al. ------ | 226—109 |

FOREIGN PATENTS

| | | |
|---|---|---|
| 1,006,962 | 4/1952 | France. |

BERNARD KONICK, *Primary Examiner.*

A. I. NEUSTADT, *Assistant Examiner.*

UNITED STATES PATENT OFFICE

CERTIFICATE OF CORRECTION

Patent No. 3,321,752 May 23, 1967

Laverne R. Peterson

It is hereby certified that error appears in the above numbered patent requiring correction and that the said Letters Patent should read as corrected below.

Column 7, line 45, for "circiuts" read -- circuits --; column 8, line 58, for "registartion" read -- registration --; column 10, line 8, for "date" read -- data --.

Signed and sealed this 9th day of January 1968.

(SEAL)
Attest:

Edward M. Fletcher, Jr.
Attesting Officer

EDWARD J. BRENNER
Commissioner of Patents